(12) United States Patent
Coronado et al.

(10) Patent No.: US 8,304,465 B2
(45) Date of Patent: Nov. 6, 2012

(54) HIGH STRENGTH AIR-DRIED AEROGELS

(75) Inventors: Paul R. Coronado, Livermore, CA (US); Joe H. Satcher, Jr., Patterson, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1442 days.

(21) Appl. No.: 11/335,297

(22) Filed: Jan. 18, 2006

(65) Prior Publication Data

US 2007/0167534 A1 Jul. 19, 2007

(51) Int. Cl.
*C08J 9/28* (2006.01)

(52) U.S. Cl. ............ 521/63; 521/64; 521/181; 521/136; 264/29.1; 264/29.6; 423/445 R; 423/447.4

(58) Field of Classification Search ............. 521/63, 521/64, 181, 136; 423/445 R, 447.4; 264/29.1, 264/29.6
See application file for complete search history.

(56) References Cited

U.S. PATENT DOCUMENTS

| | | | |
|---|---|---|---|
| 4,873,218 A | | 10/1989 | Pekala |
| 4,997,804 A | | 3/1991 | Pekala |
| 5,086,085 A | | 2/1992 | Pekala |
| 5,476,878 A | | 12/1995 | Pekala |
| 5,686,031 A | | 11/1997 | Coronado et al. |
| 5,945,084 A | * | 8/1999 | Droege ............... 423/447.4 |
| 6,005,012 A | | 12/1999 | Hrubesh et al. |

OTHER PUBLICATIONS

Wu, et el., Organic and Carbon Aerogels from the NaOH-catalyzed Polycondensation of Resorsinol-Furfural and supercritical Drying in Ethanol, J. Appl. Polym. Sci., V. 96, 4, 1429-35, Mar. 17, 2005.*
Pekala et al, "Aerogels Derived from Multifunctional Organic Monomers" Journal of Non-Crystalline Solids, vol. 145, Nos. 1/3, pp. 90-98 (1992).
Pekala et al, "Structure and Performance of Carbon Aerogel Electrodes" Mat. Res. Soc. Symp. Proc., vol. 349, pp. 79-85 (1994).
Pekala et al, "Resorcinol-Formaldehyde Aerogels and Their Carbonized Derivatives," Polymer Preprints, vol. 39, pp. 221-223 (1982).
Pekala et al., "Carbon Aerogels and Xerogels," Mat. Res. Soc. Symp. Proc., vol. 270, pp. 3-14 (1992).
Pekala et al, "Electrochemical Behavior of Carbon Aerogels Derived from Different Precursors," Mat. Res. Soc. Symp. Proc., vol. 393, pp. 413-419 (1995b).
Pekala et al, "Organic Aerogels from the Polycondensation of Resorcinol with Formaldehyde", J. Materials Science, vol. 24, pp. 3221-3227 (1989a).

* cited by examiner

*Primary Examiner* — Irina S Zemel
(74) *Attorney, Agent, or Firm* — Dominic M. Kotab

(57) ABSTRACT

A method for the preparation of high strength air-dried organic aerogels. The method involves the sol-gel polymerization of organic gel precursors, such as resorcinol with formaldehyde (RF) in aqueous solvents with R/C ratios greater than about 1000 and R/F ratios less than about 1:2.1. Using a procedure analogous to the preparation of resorcinol-formaldehyde (RF) aerogels, this approach generates wet gels that can be air dried at ambient temperatures and pressures. The method significantly reduces the time and/or energy required to produce a dried aerogel compared to conventional methods using either supercritical solvent extraction. The air dried gel exhibits typically less than 5% shrinkage.

25 Claims, No Drawings

HIGH STRENGTH AIR-DRIED AEROGELS

The United States Government has rights in this invention pursuant to Contract No. W-7405-ENG-48 between the United States Department of Energy and The University of California for the operation of Lawrence Livermore National Laboratory.

BACKGROUND OF THE INVENTION

1. Field of the Invention

The present invention relates to open-pore microporous, macroporous and mesoporous materials, such as aerogels, and particularly to processes and methods for making high strength aerogels which do not require supercritical solvent extraction or solvent exchange drying techniques, and to such high strength, low density aerogels and/or xerogels. More specifically, the present invention relates to low-density, high strength, monolithic aerogels and/or xerogels made from polyhydroxy benzenes and aldehydes in defined ratios

2. Description of Related Art

Aerogels are a special class of open-cell foams derived from highly crosslinked inorganic or organic gels. These materials have fine or ultrafine cell/pore sizes, continuous porosity, high surface area, and a microstructure composed of interconnected colloidal-like particles or polymeric chains with characteristic diameters of 10 nanometers (nm). This microstructure is responsible for the unusual optical, acoustical, thermal, and mechanical properties of aerogels. By definition, these materials are prepared through the sol-gel process and can be either granular or monolithic.

Aerogels are characterized by the presence of nanometer size pores and particles, wherein size may be dependant on the density (porosity) and the chemistry of formation. Organic aerogel particles may range in size from about two nanometers to about twenty microns. Aerogels may be made with dimensions of the pores and particles less than that of the wavelengths of visible light, resulting in transparency and other exceptional properties. By increasing the size of the particles and/or pores, opaque aerogels may be produced.

Aerogels are also characterized by the nature of their porosity (e.g., pore size and pore distribution). Typically, they possess micro-pores, meso-pores, and macro-pores. Micropores generally include pores with dimensions less than about 2 nm; these are often pores within or between individual particles. Meso-pores are generally pores with dimeinsions about 2 nm to about 50 nm; these are often associated with the spacing between particles or chains of particles. In aerogels, macro-pores are generally pores with dimensions about 50 nm to about 100 nm. The high surface areas of aerogels (e.g., 300 to 1000 $m^2/g$) is attributed to the porous nanostructure.

Organic aerogels result from the reactions of certain organic compounds, for example (1) resorcinol with formaldehyde (known as RF aerogel); (2) melamine with formaldehyde (known as MF aerogel); and (3) phenolic-furfural with propanol. Such aerogels can be prepared in monolithic form and have been employed in numerous applications, including dielectric materials, such as capacitors.

In the case of the preparation of organic RF aerogels, a phenolic substance such as resorcinol is combined with an aldehyde, such as formaldehyde, in the presence of at least one catalyst. The gels so formed can be exchanged into an organic solvent and/or supercritically dried with $CO_2$. Examples of preparations of organic and carbon aerogels can be found in U.S. Pat. Nos. 4,873,218; 4,997,804; 5,086,085; and 5,476,878, issued to Pekala, the disclosures of which are incorporated by reference herein in their entireties.

In the manufacture aerogels, the porous gel material is dried by removing the liquid from a two-phase liquid-solid network. Aerogels of the prior art are dried using special techniques to preserve the tenuous solid network. The network of one type of microporous material, an organic aerogel, is typically produced in a two-step process. The first step comprises the "sol-gel" chemical reaction that produces the aerogel structure in solution. In this step, sols are formed, and the sols link until a connected solid structure (a gel) forms, which is surrounded by a liquid by-product of the same reactions.

In the second step, after gelation is complete, and often after additional time for curing, the gel is dried by removing the liquid from the pores. Ideally, this is accomplished in such a way as to only minimally change the porosity of the wet gel. Depending on the concentration of reactants and/or catalyst in the mixture, the gelling step can occur in minutes or hours, but typically takes days, and can require weeks for dilute mixtures.

The small size of the pores results ill useful physical properties, but also complicates the drying of the wet gels to aerogels. The pore sizes in the material are so small that the flow of liquid to the surface from within the gel is limited. In evaporative drying, the surface tension of the liquid in the small pores creates extremely high forces as the material dries, which tend to collapse the weak solid structure of the gel. The gels are typically not strong enough to resist this shrinkage during evaporation. The forces become significant when the pores become less than one micron in diameter. For porous solids like aerogels, whose average pore size is much less than one micron, evaporative drying, if applicable at all, must be done extremely slowly to minimize cracking and shrinking. These long drying times can also limit large scale production.

Techniques for improving the process of drying gels to aerogels involve one of two basic ideas. One idea is to modify the surface energy of the gel chemically. The surface tension forces are reduced below the basic strength of the gel, so the liquid is removed with minimal stress to the gel. These methods may require hours or even tens of hours to complete the entire process of making and drying the gels.

Solvent exchange methods comprise substituting the original solvent used in the gel-sol process is substituted for a solvent of lower surface tension. The process typically requires several solvent substitution steps to gradually increment down the solvent surface tension to a point wherein the gel can be air dried. Solvent exchange drying methods are deficient in that they require multiple steps and multiple solvents, and are generally not effective in making monolithic aerogels with very low densities.

The other idea is to change the temperature (or the pressure) of the gel so that the pore liquid is transformed to another state of matter (i.e., solid, gas, or supercritical fluid). The new state has reduced interfacial surface tension with the gel and can be removed from the gel without excessive shrinkage, either by evacuating or purging with a gas.

Supercritical fluid extraction (or drying) exerts no surface tension across the cells and pores of the aerogel structure, preserving the integrity thereof. Monolithic aerogels made in accordance with the teachings of the prior art, in particular, necessitate supercritical drying of cross-linked organic or inorganic gels because of their extremely line pore size. Where monolithic aerogeis are desired, it is important to preserve the porosity and particle distribution in order to preserve the monolithic structure. Thus the drying step is important in making monolithic aerogels.

In supercritical drying, the gel is placed in an autoclave where the temperature and pressure are increased above the supercritical point of the fluid in the pores. This technique has a drawback. The gel may crack during heating because the liquid solvent within the gel expands faster than it can flow through the very fine pores, thus causing tension and internal stresses in the gel. To avoid cracking, the stresses cannot exceed the basic strength of the gel (i.e., its modulus of rupture). The rate of heating the gel must be slowed so that the rate of expansion of the liquid solvent does not stress the gel beyond its modulus of rupture.

A related conventional method comprises freeze-drying, where the liquid is cooled to a solid and sublimed. As with supercritical drying methods, freeze-drying methods are time-consuming, energy-intensive, and require additional materials processing. They are inherently batch processes and not amenable to rapid processing for mass production. Drying through supercritical solvent extraction is further energy intensive and requires specialized equipment.

Such drying techniques of the art are disclosed in U.S. Pat. Nos. 4,873,218 and 4,997,804, both the Pekela, which relate to low density resorcinol-formaldhyde aerogels, dried by supercritical solvent extraction and/or solvent exchange.

U.S. Pat. No. 6,005,012 to Hrubesh et al. describes a method for preparing monolithic, transparent aerogels having hydrophobic properties. The aerogels of Hrubesh et al. rely on solvent exchange and/or supercritical extraction to dry.

U.S. Pat. No. 5,686,031 to Coronado et al. is exemplary in disclosing a method for making microporous and mesoporous materials, including aerogels wherein a gel precursor liquid is heated and allowed to generate internal pressure within a confining vessel, and a supercritical extraction is employed to remove the internal gel liquid from the gellation process.

The prior art, as exemplified by the foregoing references, is consistent in teaching organic aerogeis made using a stoichiometric or near stoichiometric R:F ratio of about 1:2 or about 1:1.5, or greater ratios of resorcinol to formaldehyde. The art further teaches that only the final total solution volume (to dictate an "R" or % solids value), and the catalyst concentration (R/C ratio) can be varied to vary particle and/or pore size of the resulting gel.

In addition to the R:F ratio, the molar concentration of resorcinol to catalyst (R/C ratio) is considered important to controlling properties of the gel thereby produced. In the art, it is known that the size and number of resorcinol-formaldehyde clusters generated during the polymerization may be controlled by the R/C ratio. R/C values of 50-300 provide an acceptable range in which transparent gels can be synthesized. Outside of this range, opaque gels or precipitates are usually obtained.

The art teaches that, for organic aerogels, the concentration of resorcinol to catalyst (R/C) ratio is the dominant factor which affects the density, surface area, and mechanical properties of RF aerogels. These aerogels are composed of interconnected colloidal-like particles derived from the clusters formed in solution. Under high catalyst conditions (i.e., R/C =50), the particles have diameters of 3-5 nm and are joined together with large necks, giving the aerogel a fibrous appearance. Under low catalyst conditions (i.e., R/C =200), the particles have diameters of 11-14 nm and are connected in a 'string of pearls' fashion.

U.S. Pat. No. 5,945,084 to Droege discloses methods by which density of an organic aerogel, is modified. By using ratio of resorcinol:catalyst of about 2000:1, Droege attempted to decrease the size of nucleation sites to result in larger particles and pore sizes, in order to be able to air dry the resultant aerogel. Droege teaches, as do others in the art, that a stoichiometric ratio of resorcinol:formaldehyde (R:F) preferably a slight excess of formaldehyde, be used.

The art has thus focused on modifying the density of the aerogel, or modifying the RIC ratio, in order to produce low-density monolithic areogels.

The art is deficient in teaching, disclosing or suggesting any means of drying other than by supercritical fluid extraction as a means of drying an aerogel to obtain a sufficiently strong, low density monolithic product.

A need exists, therefore, for a method by which gels may be made which can be air dried into continuous porosity, low density, high strength, organic foams or aerogels.

A need exists, therefore, for a method by which gels may be made which can be air dried into monolithic, low density, high strength, organic foams or aerogels.

A need therefore also exists to produce monolithic, or continuous porosity, low density organic foams or aerogels which do not require energy or equipment intensive drying methods, such as supercritical solvent extraction, but instead can be air dried.

Therefore, in view of the foregoing, there is a need to solve one or more of these disadvantages of the prior art products and methods.

SUMMARY OF THE INVENTION

In one or more embodiments, the present invention comprises a method for the preparation of low density, high strength, air-dried organic aerogels, which can be in monolithic form. The method comprises the sol-gel polymerization of resorcinol with formaldehyde (RF) in aqueous solvents with R/C ratios greater than about 1000:1 and R:F ratios less than 1:2. By "less than" 1:2, the ratio is considered a fraction, that is ½. In one or more embodiments of the present invention, an R:F ratio is less than about 1:2.1. In one or more embodiments of a method of the present invention, resorcinol-formaldehyde (RF) gels can be air dried to generate organic aerogels with typically less than about 5%, preferably less than about 3%, shrinkage. These aerogels made in accordance with the methods described herein can be advantageously designed to possess a range of particle and pore sizes, for example, a particle size range of from about 2 nm to 20 microns, and/or a pore size range of from about 2 nm to 50 microns.

In one or more embodiments, the present invention provides an organic gel which can be air dried into a low density, high strength continuous porosity organic aerogel, and a method of making thereof.

In one or more embodiments, the present invention provides an organic gel which can be air dried into a low density, high strength monolithic organic aerogel, and a method of making thereof.

In one or more embodiments, the present invention provides an organic gel which can be air dried into a low density, high strength granular organic aerogel, and a method of making thereof.

In one or more embodiments, the present invention provides for a low density, high-strength organic aerogel made by air drying a gel comprised of formaldehyde and phenolic substances.

In other embodiments, the present invention provides for a high strength organic aerogel with a density of about 250 mg/cm$^3$ or less, preferably about 190 mg/cm$^3$ or less, and possessing a fine cell size. A density range may be from about 30-250 mg/cm$^3$, preferably from about 50-240 mg/cm$^3$.

In other embodiments, the present invention provides for low density high strength aerogels which may be monolithic or granular, and which are suitable for applications as known in the art for such materials, comprising: electrochemical cells, electrical storage materials (including dielectrics) membranes, chemical catalysis, and ion exchange reactions.

In other embodiments, the present invention comprises two or more of the foregoing embodiments.

The present invention, in one or more aspects, comprises a method of efficiently producing microporous and mesoporous materials, while simultaneously preventing shrinkage and cracking. The present method minimizes the energy and complexity associated with supercritical fluid extraction processes. It has been found that at a defined ratio of R:F the aerogels can be air dried with no loss of structural integrity. The surface tension stresses that cause the gel to shrink or crack when solvent is removed by simple evaporation are mitigated. The resultant aerogels are not as friable as air dried aerogels of the art, and do not crumble or readily transfer material to another surface with which they may come into contact.

Control over the formulation and drying steps of the aerogels treated by the invention allows for the production of monolithic or granular organic aerogels having variable properties including densities, surface areas, porosities, surface wettabilities, and the like.

While described in terms of organic gels, the methods of the present invention can be applied to inorganic aerogels. The compositions and methods described herein may advantageously eliminate the time-consuming and/or energy-intensive and/or equipment-intensive processes conventionally required to remove the pore fluid solvent(s). The improved method can be used to semi-continuously process microporous materials, thus providing considerable savings in time, energy, and cost for many microporous materials. For aerogels and xerogels, one or more of the methods of the present invention could reduce the production and material costs.

DETAILED DESCRIPTION OF THE INVENTION

Definitions

Before describing the present invention in detail, it is to be understood that the invention is not limited to the particularly exemplified apparatus, systems, methods, or processes disclosed herein, which may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include the plural unless the content clearly dictates otherwise.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

Amount of ingredients, materials or substances are listed as the ranges or levels of ingredients in the descriptions, which follow hereto.

"Air dried" (or drying) and evaporative drying are used interchangeably, unless the context indicates otherwise, and refer to the process by which a substance (e.g. a liquid) changes to the gaseous or vapor phase.

"High-strength" referring to an aerogel, means a dried aerogel which substantially retains its monolithic form.

"Low density" means a density of less than 250 mg/cm$^3$, preferably less than 190 mg/cm$^3$. In some embodiments of the present invention low density ranges from about about 30 to 250 mg/cm$^3$, preferably from about 50 to 240 g/cm$^3$.

References to "resorcinol", unless otherwise clear from the context is meant to include resorcinol, and any and all hydroxybenzene compounds which can react with an aldehyde to form the cross-linked gel structures herein.

References to "formaldehyde", unless otherwise clear from the context is meant to include formaldehyde and any and all aldehyde compounds which can react with the resorcinol to form the cross-linked gel structures herein.

The present invention relates to a method for producing an organic aerogel, especially a monolithic organic aerogel, with minimal shrinkage upon gellation, and good physical, structural properties, while eliminating the need for complex, and energy-intensive drying, such as supercritical drying. Moreover, the aerogels of the present invention do not require unduly lengthy drying times, or elevated drying temperatures. The present invention further comprises the areogels produced by the methods described herein, and pyrolysis products thereof, as well as their methods of use.

In conventional methods, the pH range of the reaction mixture, which is primarily determined by the concentration of catalyst, is controlled to yield a reaction mixture pH which falls in the narrow range of 6.5 to 7.4. Typically, the reaction parameter R/C, which is the ratio of the number of moles of hydroxylated benzene compound (for example, resorcinol) to the number of moles of catalyst and which thus helps determine the pH of the reaction mixture, is selected to be from about 50 to about 400. Also in conventional methods, the solids content is often controlled. Typically, the reaction parameter R, which is the weight % of the hydroxylated benzene compounds and aldehydes in the reaction mixture with respect to total volume, is selected to be from about 5-40% w/v.

Using these conventional methods and reaction parameters, gels can be obtained which may be successfully dried (albeit using complex, intensive, and expensive methods) to produce organic aerogels and, upon pyrolysis, carbon aerogels, both of which possess typical aerogel properties, such as transparency (except for carbon aerogels), high surface area, fine or ultrafine particle size, and porosity. However, these conventional gels cannot survive simple evaporative drying of pore fluids comprising high surface tension solvents such as the water. Upon simple evaporative drying the gels shrink and crack. The resulting products do not retain the morphology of the original gel.

Others in the art (see U.S. Pat. No. 5,945,084 to Droege) have found that at lower catalyst concentrations (i.e., an R/C value of greater than about 1000, especially about 2000), organic gels can be obtained which can be air, or evaporative dried.

It has been surprisingly found by the inventors herein that an important factor impacting the morphology of the RF aerogel is the value of the molar concentration of hydroxybenzene component divided by the molar concentration of the aldehyde component. At conventional R:F ratios (e.g., R:F of about 1:2 or higher (such as 1:1.5, or 1:1, for example) typically small particles (on the order of about 10 nm), and small pores (also on the order of about 10 nm) are formed, and a particle and pore size distribution generally favors such smaller particle and pore sizes. Such small size and generally small size distribution of particles and pores contributes to the difficulty of evaporative drying the gels when a high surface-tension solvent, such as water, is employed.

In one embodiment, the organic gels used produce aerogels are the hydroxylated benzene-aldehyde gels. Thus, the gels are obtained by the polycondensation of hydroxylated benzene compounds, such as resorcinol, with aldehydes, such as formaldehyde. A resorcinol-formaldehyde polymer (so-called RF polymer) may be formed in which resorcinol monomers are linked by methylene and methylene ether bridges to form a crosslinked network.

In one or more embodiments of the present invention, the pore sizes of the dried aerogels produced by the method of the invention are generally of diameter of from about 2 nm to 50 microns, and more particularly are less than about 10 microns. In some embodiments of the present invention, the aerogel solids may include at least about 90%, preferably at least about 99% of the total pore volume in pores of diameter from about 2 nanometers to about 10 microns. In some embodiments of the present invention, the aerogel solids may include at least 90%, preferably at least about 95% of the total particle size of diameter from about 100 nanometers to about 5 microns. In some embodiments of the present invention, the aerogel solids may include at least 90%, preferably at least about 99% of the total pore volume in pores of diameter from about 2 nanometers to about 10 microns, and may further include at least about 90%, preferably at least about 95% of the total particle size of diameter from about 500 nanometers to about 10 microns.

In one or more embodiments of the present invention, the surface area of the aerogels is nominally at least 200 $m^2/g$, preferably at least about 300 $m^2/g$, and more preferably at least 400 $m^2/g$, calculated by the B.E.T. method. In one or more embodiments of the present invention, the surface area may be above about 500 or 600 or 700 or 800 $m^2/g$. The densities of the dried aerogels made using such methods typically range from 50-500 $mg/cm^3$, and are preferably between about 50-240 $mg/cm^3$. The pore volume of the dried aerogels typically range from about 1 $cm^3/g$ to about 100 $cm^3/g$, calculated by nitrogen adsorption.

Resorcinol, also referred to as 1,3-dihydroxybenzene ($C_6H_4(OH)_2$), undergoes most of the typical reactions of phenol but at a much faster rate because of the enhanced electron density in the 2-, 4-, and 6-ring positions. Resorcinol, like phenol, is known to react with formaldehyde (i.e., $CH_2O$) under alkaline conditions to form mixtures of addition and condensation products. The 1,2-dihydroxybenzene (catechol), and 1,4-dihydroxybenzene (hydroquinone) isomers are also suitable reactants for the methods and compositions of the present invention, and references herein to "resorcinol", unless otherwise clear from the context, should be considered to encompass all such isomers.

RF gels formed using the R:F ratios in accordance with one or more embodiments of the methods and processes of the invention herein, and with essentially conventional catalyst concentrations, advantageously yield gel materials which, upon drying, form opaque aerogels, especially monolithic aerogels, characterized by a distribution of relatively larger particles and pore/cell sizes, particularly compared to particle and/or pore sizes of transparent aerogels.

In accordance with the present invention, it has been found by the inventors herein that at lower than conventional R:F ratios (i.e considering R/F, when R=1, F=2.1 or more, such as 4) larger particles (e.g., about 50 nm) typically are formed, larger pores typically are formed (e.g. about 50 nm), and a particle and pore size distribution is generally shifted to a higher range. Also, at conventional R:F ratios of about 1:2 or greater, high surface areas (e.g., 900 $m^2/g$) are often found, whereas at the low R:F ratios of the present invention as defined herein, lower surface areas (e.g., about 400 $m^2/g$ or less) are often found. The higher surface areas found with conventional R:F ratios are thought to be may be caused by the formation of a large number of very small particles. At the lower R:F ratios of the present invention, the organic gels are typically opaque and result in dried organic aerogels which are not transparent to visible light. This appears to be due to the formation of large particles and pore spaces which scatter visible light.

In accordance with various embodiments of the present invention, a ratio of resorcinol to formaldehyde (R:F) is about 1:2.1 or less. Preferably the R:F ratio is about 1:2.2 or 1:2.3 or 1:2.4 or 1:2.5 or 1:2.6 or 1:2.7 or 1:2.8 or 1:2.9 or 1:3 or 1:3.1, or 1:3.2 or 1:3.3 or 1:3.4 or 1:3.5 or 1:3.6 or 1:3.7 or 1:3.8 or 1:3.9 or 1:4 or 1:4.1 or 1:4.2 or 1:4.3 or 1:4.4 or 1:4.5 or 1:4.6 or 1:4.7 or 1:4.8 or 1:4.9 or 1:5 or less. In some embodiments a R:F ratio is between about 1:3 and 1:8, preferably between about 1:3.5 and 1:6 and most preferably is about 1:4 or less.

Accordingly, in one or more embodiments, a method of the present invention comprises reacting a hydroxybenzene, particularly a polyhydroxybenzene with an aldehyde, particularly formaldehyde, in a predetermined ratio, in the presence of a base catalyst, such as sodium carbonate, in an aqueous solution, at an appropriate temperature and for a period of time, sufficient to form a gel.

Thus, in one or more embodiments, the present invention comprises a method for preparing a chemically crosslinked organic gel comprising the steps of:

(a) forming a reaction mixture comprising at least one hydroxylated benzene compound, at least one aldehyde, a catalyst, and solvent; wherein a molar ratio of the hydroxylated benzene compound to the aldehyde, is less than about 1:2.1;

(b) heating said reaction mixture to form an organic gel; and (c) evaporatively drying said gel to form an aerogel.

The reaction typically results in methylene bridges between the resorcinol molecules with some hydroxymethyl groups also present. These hydroxymethyl groups can be made to self-condense in the presence of an acid to form ether bridges and provide additional crosslinking. For the resorcinol-formaldehyde reaction, the initial pH of the mixture is preferably maintained in the range of about 4.7 to about 7.

The term "hydroxylated benzene compound," as used herein, relates to compounds comprising at least one benzene ring, which benzene ring possesses at least one hydroxyl group (i.e., —OH). Examples of suitable hydroxylated benzene compounds include phenol, catechol, resorcinol, hydroquinone, and phloroglucinol, and mixtures thereof. Typically, the hydroxylated benzene compounds are provided as solids.

The hydroxylated benzene may include other substituents at non-hydroxylated ring positions, as long as such substituents do not unduly interfere with the polymerization reaction. Also, many hydroxylated benzene compounds are commercially available in combination with a small amount of an aldehyde (e.g., formaldehyde) in a partially condensed form, that is, as low molecular weight polymers. These materials may also be useful hydroxylated benzene compounds.

The term "aldehyde" is used herein in the conventional sense, and relates to organic compounds which comprise an aldehyde group (i.e., —CHO). Many aldehydes may be represented by the formula R—CHO, wherein R is an aldehyde substituent. The aldehyde may be selected from $C_{1-9}$ alkyl aldehydes, or aryl aldehydes. Examples of suitable aldehydes include formaldehyde, acetaldehyde, propionaldehyde, butyraldehyde, benzaldehyde, glyoxal, glutaraldehyde, and mixtures thereof. The longer chain length aldehydes may exhibit some degree of branching, and may also include substituents, as long as the polymer formation is not thereby significantly inhibited.

Typically, the aldehydes are provided as liquids, in an aqueous solution. For example, formaldehyde is widely commercially available as a 37.6% by weight aqueous solution. The aqueous nature of the aldehyde solution facilitates the use of water as the solvent for the gel-sol reaction, however it is within the scope of the present invention to use non-aqueous solvents, such as acetone, amyl acetate, dimethylsulfoxide, hydroxylic solvents such as glycols and short chain alcohols, including methanol, ethanol, propanol and isopropanol, and mixtures thereof.

The term "catalyst," as used herein, relates to compounds which act as a catalyst for the reaction between a hydroxylated benzene compound and an aldehyde. In one embodiment, the catalyst is a base catalyst (i.e., is able to act as a Bronsted base). Examples of suitable base catalysts include carbonates, such as sodium carbonate (i.e., $Na_2CO_3$) and potassium carbonate (i.e., $K_2CO_3$). In one embodiment, the catalyst is an acid catalyst (i.e., is able to act as a Bronsted acid). An example of a suitable acid catalyst is trifluoroacetic acid (i.e., $CF_3COOH$).

Typically, the catalyst is provided as a solid or as an aqueous solution. For example, high purity sodium carbonate is widely commercially available. A suitable aqueous solution may be prepared, for example, by dissolving an appropriate amount of sodium carbonate in distilled deionized water to yield a solution having the desired concentration (e.g., 0.1 M sodium carbonate).

An R/C ratio, i.e. number of moles of hydroxylated benzene compound to the number of moles of catalyst in the reaction mixture is as known in the art, and preferably is between about 100:1 to 1000:1, and may be 50:1 to 500:1.

In some embodiments, reaction temperatures may be in a range of from about 20° C. to about 100° C., preferably about 30° C. to about 50° C., and more preferred is about 85° C. The gelation temperature may vary according to the gelation time, the composition of the reaction mixture, and the quantity of reaction mixture. In some embodiments, a reaction time of about 48 hours to about eight days has been found to be suitable. In one or more embodiments, a reaction time of about 36 hours is preferred for crosslinking to form the gel. In one or more embodiments, a reaction time comprises from about 0.1 to about 3 hours. The gel thus formed may be further treated to promote cross-linking and/or to further stabilize the chemical structure thereof. Thus, in one or more embodiments of the present invention, the gel may be acid-washed to remove sodium salts and the excess base and to promote further crosslinking of the gel, which imparts stability to the gel structure.

In some embodiments, the resulting organic gel is further cured by heating the organic gel at a curing temperature for a curing time. Thus, in one or more embodiments, the present invention pertains to methods for preparing a cured organic gel comprising the steps of:
(a) forming a reaction mixture comprising at least one hydroxylated benzene compound, at least one aldehyde, a catalyst and solvent; wherein a molar ratio of the hydroxylated benzene compound to aldehyde is less than about 1:2.1;
(b) heating said reaction mixture at a gelation temperature for a gelation time to form an organic gel;
(c) heating said organic gel at a curing temperature for a curing time to form a cured organic gel; and
(d) allowing the resultant cured organic gel to air dry.

In one or more embodiments of the present invention, the resorcinol-formaldehyde mixtures gel within 24 hours. In one or more embodiments, it may be important to cure the gels for a minimum of 1, preferably 3 days before they can be dried. In some embodiments, an additional cure time is needed such that gravity will not cause the gels to deform under their own weight. In other embodiments, a standard cure time of 7 days is used, because compression modulus measurements show that the gels reach an asymptotic value after this period of time. Generally, cure time is not critical to the methods and products of the present invention, as long as the gel is cured sufficiently to be used for its intended purpose. Thus in a preferred embodiment, the gel is cured for a time sufficient to yield, upon air-drying, a stable, low-density monolithic gel, especially one wherein an asymptotic compression modulus value is reached.

In some embodiments, the curing temperature is usually higher than the gelation temperature used. The curing temperature may vary according to the curing time, the composition of the organic gel and the quantity of organic gel. In one or more embodiments, the curing temperature is from about 50° C. to about 95° C. In one or more embodiments, the curing temperature is from about 60° C. to about 90° C. In one or more embodiments, the curing temperature is about 85° C. The curing time may vary according to the curing temperature, the composition of the organic gel and the quantity of organic gel. In some embodiments, the curing time may be from about 1 to about 72 hours. In one or more embodiments, the curing time may be from about 3 to about 48 hours. The organic gel may be heated, for example, using conventional means, to assist in curing. Typically, a heat resistant container which contains the organic gel is placed in a thermostat controlled oven, at the desired temperature. In some embodiments, the heat is applied as a constant temperature over time. In some embodiments, a temperature protocol, i.e. variable temperatures over time, are employed. The heat, if applied, may be applied in otherwise normal or ambient conditions, e.g. ambient pressure and humidity.

In one or more embodiments of the present invention, the organic gels of the present invention are dried by evaporative drying. Without wishing to be bound to any particular theory, it is postulated that the gel made in accordance with the present invention, comprising the defined R:F ratio and comprising the hydroxybenzene and aldehyde components disclosed herein, has larger than typical meso-pore dimensions (which result from the use of a lower R:F ratio, and that the larger dimensions facilitate the evaporative drying, while permitting the gel to retain a monolithic structure. It is possible that the formation of larger than typical particles at low R:F permits the formation of meso-pores in the particles themselves, rather than solely between particles and particle chains.

In one or more embodiments, the organic gel, or alternatively, the cured organic gel, may be dried at an elevated temperature, and/or dried under varying humidity conditions. The drying temperature may vary according to the drying time, the composition of the organic gel/cured organic gel and the quantity of organic gel/cured organic gel. The drying temperature is typically from about 20° C. to about 180° C. In one or more embodiments, the drying temperature is from about 20° C. to about 100° C., more preferably about 30° C. to about 90° C. Typical drying pressures would usually be atmospheric, although less than atmospheric pressure may be applied, during part or all of the drying process, to speed drying. In some embodiments of the present invention, it may be advantageous to the resultant aerogel structure to apply greater than atmospheric pressure during part or all of the drying cycle. It is thought that, in some embodiments, some application of elevated pressure can advantageously result in a change in the distribution of pore sizes, with a greater proportion of larger pores, thus contributing to the desired result of a low-density, monothlic aerogel, produced by air drying.

In a preferred embodiment drying of the aerogel is preferably accomplished passively, without the need to transfer energy (e.g. in the form of heat, pressure change or the like) to the aerogel. Thus preferably the solvent is allowed to evaporate at ambient conditions. Evaporation may occur at or about room temperature (20° C.) and pressure. In one embodiment of the method of the present invention, the rate of drying may be increased by applications of heat, partial vacuum, air circulation, or combinations thereof.

The drying time may vary according the drying temperature, the composition of the organic gel/cured organic gel and the quantity of organic gel/cured organic gel. In some embodiments, the drying time may be from about 1 to about 96 hours. In one embodiment of the present invention, the drying time is from about 2 to about 48 hours, preferably from about 4 to about 36 hours. In some embodiments, the drying is conducted under ambient conditions. In a preferred embodiment, the drying is conducted under conditions of temperature, humidity, pressure and air flow such that the gel is dried to a substantially monolithic aerogel, preferably having a low density and/or a high strength. In another preferred embodiment, the drying is conducted under conditions of temperature, humidity, pressure and air flow such that the gel is dried to a substantially monolithic aerogel, preferably having a low density and/or a high strength, and exhibits a shrinkage of less than about 8%, or less than about 5%, or less than about 3%.

The low density open cell organic foams of the present invention are characterized by relatively large particle and pore sizes, high porosity, and high surface area. Typically, low density open cell organic foams of the present invention have a density of about 50 to about 300 mg/cm$^3$. Typically, the low density open cell organic foams of the present invention have a surface area of about 200 to about 1000 m$^2$/g.

The low density aerogels of the present invention are also characterized by a meso-pore size distribution comprising about 99% greater than about 2 nm (e.g., from about 2 nm to about 50 microns). In one or more embodiments, the low density aerogel is characterized by a meso-pore size distribution comprising about 95% greater than about 5 nm (e.g., from about 5 nm to about 50 microns). In one or more embodiments, the low density aerogel foam is characterized by a meso-pore size distribution comprising about 95% greater than about 10 nm (e.g., from about 10 nm to about 50 microns). In one or more embodiments, the low density aerogel is characterized by a meso-pore size distribution of about 10 nm to about 20 microns.

In one or more embodiments of the present invention, the low density open cell organic foams of the present invention are characterized by a strength and distribution of micropores, meso- pores, and macro-pores such that the gel, can be air or evaporatively dried, and the resultant capillary forces acting on the gel are insufficient to collapse the gel to any significant degree, such that a stable, low-density monolithic gel results, with preferably less than about 5% or less than about 3% shrinkage.

Density of the resorcinol-formaldehyde aerogels produced by the method of this invention may be controlled by diluting with an appropriate solvent, e.g. water, to yield a density range of about 50-300 mg/cm$^3$. The foams may be of slightly higher in density than their theoretical values because of shrinkage during the drying step. However, the methods of the present invention minimize shrinkage to less than about 8%, preferably less than about 5%, more preferably less than about 3% by volume.

The aerogels produced by the method of the present invention may also be carbonized by, for example, pyrolysis. In one embodiment, the pyrolysis process comprises heating to temperatures in the range of about 600° C. to about 1200° C., in an oxygen-deficient environment, for example in a nitrogen atmosphere, to yield carbon foams of very low densities and ultra-fine cell size or microcellular structure. Since the aerogels produced by the methods of the present invention, when dried, result in dry foams, the terms "aerogel" and "foam" have been used interchangeably in the description of the preferred embodiments and in the claims. Such use is not to be construed as limiting the product to one or the other of the two forms, aerogel or foam.

EXAMPLE 1

Gel Preparation

This Example describes a sol-gel polymerization of 1,3-dimethoxybenzene (resorcinol) and formaldehyde in solvent (water). The ratio of R:F was about 0.25 (stated alternatively about 1:3.94). Thus, 12.38 g of resorcinol (0.112 mol), 35.8 g of 37% aqueous formaldehyde (13.25 g, 0.441 mol) and water (40.5 mL) were stirred together until the resorcinol dissolved. Next 0.555 g of a 0.1 M sodium carbonate solution (0.056 mol) was added with stirring. The reaction mixture was stirred vigorously at room temperature for 0.5 h. The clear solution was then poured into polyethylene vials, sealed and cured at 50° C. for 1 day during which time the reaction mixture turned to a dark orange color. The vials were then transferred to an 85° C. oven to cure for 3 days. After cooling slowly to room temperature the samples were allowed to air dry (1-7 days depending on dimensions) and exhibited typically less than 3% total linear shrinkage during this process. Such a process produces a high strength organic aerogel with a nominal density in this case of about 240 mg/cm$^3$. Other examples made as Example 1 result in densities of about 190 mg/cm$^3$ to about 250 mg/cm$^3$.

The materials may be subsequently pyrolyzed to produce a carbon aerogel with a nearly identical density.

The invention is a method that allows the rapid production of microporous and mesoporous materials having continuous porosity. Microporous materials have a predominance of pores with an average size less than 0.05 micrometers. Mesoporous materials have a predominance of pores with an average size less than one micrometer. The porous materials may include aerogels, xerogels, cryogels, polymer foams, pre-ceramics, porous glasses, and biofoam. Most porous materials of these types have a distribution of both micro- and mesopores, but aerogels are predominantly microporous.

While described in terms of RF gels, the methods of making of the present invention can be applied to a variety of other sol-gel precursors and solvent systems. For example, a variety of other alkylated phenol derivatives and solvent systems can be used with the method of the present invention. Thus, other dihydroxy and trihydroxy benzene compounds such as catechol, hydroquinone, phloroglucinol, and various mixtures thereof, can form gels, and can be air dried to result in monolithic low-density, high strength aerogels in accordance with the teachings of the present invention. Moreover, it is within the scope of the present invention to encompass other hydroxybenzene and aldehyde gels which can be air or evaporative dried. The present invention thus encompasses such other reactants, and reaction conditions as will permit the gel to be air dried into a low-density, high strength, monolithic aerogel with less than about 5% shrinkage. Such a gel can be developed by selecting reactants, ratios and concentrations of reactants, and reaction conditions which promote the particle and pore sizes, and/or particle and/or pore size distribution, which permits air drying of the particular solvent choosen, especially relative high-surface tension solvents such as water. Additionally, while evaporative or air drying is preferred, the gels formed using the R:F ratios defined herein may be dried by conventional means, including supercritical solvent extraction and/or solvent exchange methods.

The foregoing description of preferred embodiments of the invention is presented for purposes of illustration and description and is not intended to be exhaustive or to limit the invention to the precise form disclosed. Many modifications and variations are possible in light of the above teaching.

The invention claimed is:

1. A process for the synthesis of a low density, organic aerogel the process comprising the steps of:
  mixing a hydroxy benzene and an aldehyde in a solvent in the presence of a catalyst, the hydroxy benzene and aldehyde present in a molar ratio of 1:4 or less wherein the hydroxy benzene and catalyst are added in a molar ratio of greater than 1000:1;
  heating the mixture to sufficient temperature for a sufficient time to form a stable gel; and
  allowing the gel to air dry whereby a stable, low-density monolithic structure exhibiting less than about 5% shrinkage results,
  wherein the resulting monolithic structure has a density of about 30-250 mg/cm$^3$.

2. The process of claim 1 wherein the hydroxy benzene is selected from the group consisting of resorcinol, catechol, hydroquinone, phloroglucinol and mixtures thereof; and
  the aldehyde is selected from the group consisting of formaldehyde, acetaldehyde, propionaldehyde, butyraldehyde, benzaldehyde and mixtures thereof.

3. The process of claim 1 wherein the solvent is water.

4. The process of claim 1 wherein the ratio of hydroxy benzene and aldehyde is between 1:4 and 1:8.

5. The process of claim 1 wherein the ratio of hydroxy benzene and aldehyde is less than 1:5.

6. The process of claim 1 wherein the ratio of hydroxy benzene and aldehyde is between 1:4 and 1:8, wherein the resulting monolithic structure has an unpyrollized density of about 30-190 mg/cm$^3$, wherein the resulting monolithic structure exhibits less than about 3% shrinkage.

7. The process of claim 6 wherein
  the hydroxy benzene is selected from the group consisting of resorcinol, catechol, hydroquinone, phloroglucinol and mixtures thereof; and
  the aldehyde is selected from the group consisting of formaldehyde, acetaldehyde, propionaldehyde, butyraldehyde, benzaldehyde and mixtures thereof.

8. The process of claim 7 wherein the hydroxyl benzene is resorcinol and the aldehyde is formaldehyde.

9. The process of claim 1 and further including the step of curing the mixture.

10. The process of claim 1 wherein the solvent is selected from the group consisting of acetone, amyl acetate, dimethylsulfoxide, glycol, methanol, ethanol, propanol, isopropanol, amyl acetate and mixtures thereof.

11. The process of claim 1 wherein said catalyst is sodium carbonate.

12. The process of claim 1 wherein the drying step occurs at substantially room temperature.

13. The process of claim 1 wherein the drying step occurs at a temperature of between about 20° C. and 150° C.

14. The process of claim 13 wherein the aerogel is substantially dried within 1 day.

15. The process of claim 1 wherein the resulting monolithic structure has at least about 90% of a total pore volume in pores of a diameter from about 2 nanometers to about 10 microns, a solids portion of the monolithic structure having at least 90% of a total particle size of diameter from about 100 nm to about 5 microns.

16. The process of claim 1 wherein the resulting aerogel has a density of less than about 190 mg/cm$^3$.

17. The process of claim 1 wherein the resulting aerogel has a density of between about 50-240 mg/cm$^3$.

18. The process of claim 1, further comprising the step of heating said aerogel in a nitrogen atmosphere, to a temperature in the range of about 600° C. to about 1200° C. to carbonize said aerogel and form a low density, carbon foam.

19. An aerogel produced by the process of claim 1.

20. A process for the synthesis of a low density, high strength organic aerogel of fine pore size, said process comprising the steps of:
  mixing in a predetermined ratio a polyhydroxy benzene and formaldehyde in the presence of a base catalyst;
  heating the mixture to a predetermined temperature for a sufficiently long period of time to form a stable gel; and
  air drying the gel whereby a low density, high strength monolithic aerogel, exhibiting less than about 8% shrinkage, results,
  wherein the resulting monolithic structure has an unpyrollized density of about 30-240 mg/cm$^3$.

21. The process of claim 20 wherein the hydroxyl benzene is resorcinol, the aldehyde is formaldehyde, the solvent is water, the catalyst is a base catalyst, and the molar ratio of hydroxylated benzene to formaldehyde is less than about 1:4.

22. A process for forming a low density, high strength organic aerogel, comprising
  forming a reaction mixture comprising at least one hydroxylated benzene compound, at least one aldehyde, a catalyst and solvent; wherein the molar ratio of the hydroxylated benzene compound to aldehyde is less than about 1:5;
  reacting said reaction mixture at a temperature and for a time sufficient to form an organic gel;
  heating said organic gel at a curing temperature for a curing time to form a cured organic gel; and
  allowing the resultant gel to air dry at a temperature of between about 20° C. and 150° C. whereby an uncracked, low density, high strength monolithic aerogel, exhibiting less than about 5% shrinkage, results,
  wherein the resulting monolithic structure has an unpyrollized density of 50-190 mg/cm$^3$,
  wherein the resulting monolithic structure has at least about 90% of a total pore volume in pores of a diameter from about 2 nanometers to about 10 microns,
  wherein a solids portion of the monolithic structure having at least 90% of a total particle size of diameter from about 100 nm to about 5 microns.

23. The process of claim 22 wherein the hydroxyl benzene is resorcinol, the aldehyde is formaldehyde, the solvent is water, the catalyst is a base catalyst, and the molar ratio of hydroxylated benzene to formaldehyde is between 1:4 and 1:8.

24. An aerogel made by the process of claim 23.

25. An unpyrollized organic resorcinol formaldehyde aerogel, characterized by a high strength, non friable monolithic structure, having a density of between about 30 and 190 mg/cm$^3$ and a surface area of at least about 400 m$^2$/g, wherein the aerogel is derived from air drying an organic resorcinol formaldehyde gel.

* * * * *